US009836304B2

United States Patent
Denman et al.

(10) Patent No.: US 9,836,304 B2
(45) Date of Patent: Dec. 5, 2017

(54) CUMULATIVE CONFIDENCE FETCH THROTTLING

(75) Inventors: Marvin Denman, Round Rock, TX (US); James Dundas, Austin, TX (US); Bradley Gene Burgess, Austin, TX (US); Jeff Rupley, Round Rock, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1632 days.

(21) Appl. No.: 12/946,491

(22) Filed: Nov. 15, 2010

(65) Prior Publication Data
US 2012/0124345 A1    May 17, 2012

(51) Int. Cl.
*G06F 9/38*    (2006.01)

(52) U.S. Cl.
CPC .......... *G06F 9/3804* (2013.01); *G06F 9/3844* (2013.01)

(58) Field of Classification Search
CPC .......................... G06F 9/30058; G06F 9/3804
USPC .................................................. 712/237, 239
See application file for complete search history.

(56) References Cited

U.S. PATENT DOCUMENTS

| 7,653,824 | B2* | 1/2010 | Rangarajan et al. ......... 713/300 |
| 2004/0228091 | A1* | 11/2004 | Miyairi ......................... 361/695 |
| 2008/0256345 | A1* | 10/2008 | Bose et al. ..................... 712/239 |
| 2009/0150657 | A1* | 6/2009 | Gschwind et al. ........... 712/239 |
| 2009/0177858 | A1* | 7/2009 | Gschwind et al. ........... 711/163 |
| 2009/0210663 | A1* | 8/2009 | Sartorius et al. ............. 712/207 |

OTHER PUBLICATIONS

Aragon, J.L. et al. "Power-aware control speculation through selective throttling" High-Performance Computer Architecture, 2003. HPCA-9 2003. Proceedings. The Ninth International Symposium on. Feb. 8-12, 2003.*
Aragon, J.L. et al. "Control speculation for energy-efficient next-generation superscalar processors" Computers, IEEE Transactions on (vol. 55 , Issue: 3 ) Mar. 2006.*
Malik, Kshitiz, Agarwal, Mayank, Dhar, Vikram, Frank, Matthew I. "PaCo: probability-based path confidence prediction" 2008 IEEE 14th International Symposium on High Performance Computer Architecture.*
Uht, Augustus K., Sindagi, Vijay. "Disjoint Eager Execution: An Optimal Form of Speculative Execution" Proceedings of the 28th International Symposium on Microarchitecture, IEEE Nov. 1995.*
Juan L. Aragón; José González; and Antonio González. "Power-Aware Control Speculation through Selective Throttling" Proceedings of the The Ninth International Symposium on High-Performance Computer Architecture (HPCA-9'03); 2002 IEEE.*
Amirali Baniasadi; Andreas Moshovos. "Instruction Flow-Based Front-end Throttling for Power-Aware High-Performance Processors" ISLPED'OI, Aug. 6-7, 2001.*

* cited by examiner

Primary Examiner — Jacob A Petranek

(57) ABSTRACT

A method and apparatus to utilize a fetching scheme for instructions in a processor to limit the expenditure of power caused by the speculative execution of branch instructions is provided. Also provided is a computer readable storage device encoded with data for adapting a manufacturing facility to create an apparatus. The method includes calculating a cumulative confidence measure based on one or more outstanding conditional branch instructions. The method also includes reducing prefetching operations in response to detecting that the cumulative confidence measure is below a first threshold level.

17 Claims, 5 Drawing Sheets

CUMULATIVE CONFIDENCE FETCH THROTTLING

BACKGROUND OF THE INVENTION

1. Field of the Invention

Embodiments of this invention relate generally to computers, and, more particularly, to a method and apparatus for controlling the fetching operations of a processor to conserve power.

2. Description of Related Art

To improve computational throughput, a processor may have a pipeline and one or more speculation units that provide instructions speculatively to the pipeline for processing. One such speculation unit is a branch prediction unit that predicts whether a conditional branch in a program being executed will be "taken" or "not taken" so that instructions in the predicted path can be fetched or prefetched without causing the pipeline to stall. Another type of speculation unit is known as an out-of-order execution unit. The task of the out-of-order execution unit is to reorder the flow of instructions to optimize performance as the instructions are sent down the pipeline and scheduled for execution. The instructions are reordered to allow them to execute as quickly as possible as each input operand becomes ready.

There is an incentive to construct accurate, and presumably complex, branch prediction schemes. There is also an incentive to perform as much speculative execution as possible in order to avoid pipeline stalls and improve computer performance. However, any execution of instructions by the processor consumes power. While speculative execution that turns out to be incorrect may not waste significant computing time, the energy expended in the computation is wasted because the results of the speculatively-executed instructions are discarded.

While the performance enhancement offered by speculative execution is desirable in nearly any computer, the additional power consumption it entails is a drawback. For example, when running a portable computer on battery power, it may be more important to conserve power than to try to increase computational throughput by speculative execution.

SUMMARY OF EMBODIMENTS OF THE INVENTION

In one aspect of the present invention, a method is provided. The method includes calculating a cumulative confidence measure based on one or more outstanding conditional branch instructions. The method also includes reducing prefetching operations in response to detecting that the cumulative confidence measure is below a first threshold level.

In another aspect of the present invention, an apparatus is provided. The apparatus includes a processor. The processor is configured to calculate a cumulative confidence measure based on one or more outstanding conditional branch instructions. The processor is also configured to reduce prefetching operations in response to detecting that the cumulative confidence measure is below a first threshold level.

In yet another aspect of the present invention, a computer readable storage medium encoded with data that, when implemented in a manufacturing facility, adapts the manufacturing facility to create an apparatus, is provided. The apparatus includes a processor. The processor is configured to calculate a cumulative confidence measure based on one or more outstanding conditional branch instructions. The processor is also configured to reduce prefetching operations in response to detecting that the cumulative confidence measure is below a first threshold level.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

Figure 1:
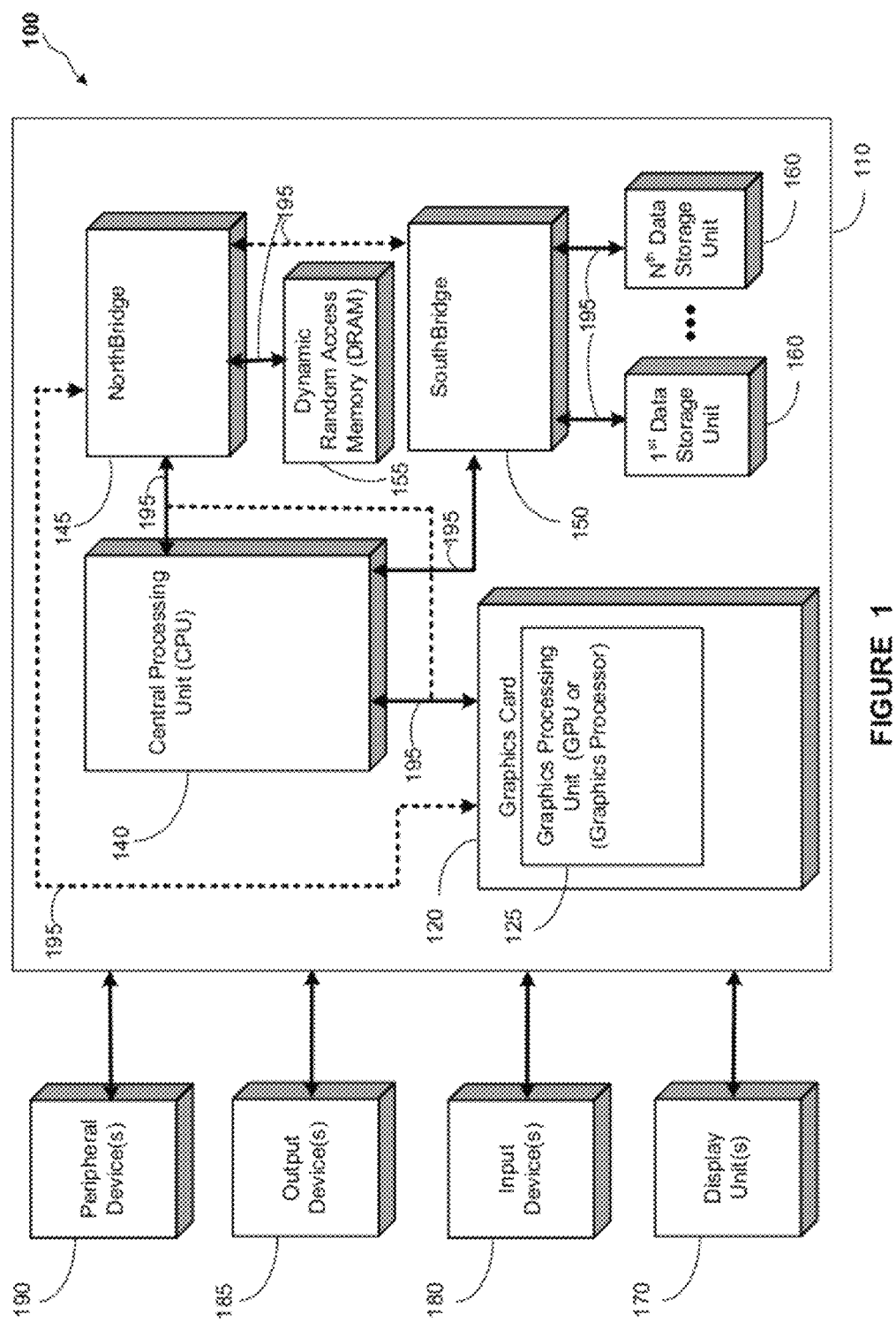
FIG. 1 schematically illustrates a simplified block diagram of a computer system according to one embodiment.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

The present invention will now be described with reference to the attached figures. Various structures, connections, systems and devices are schematically depicted in the drawings for purposes of explanation only and so as to not obscure the disclosed subject matter with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Embodiments of the present invention generally provide a fetching scheme for instructions in a processor to limit the expenditure of power caused by the speculative execution of branch instructions.

Turning now to FIG. 1, a block diagram of an exemplary computer system 100, in accordance with an embodiment of the present invention, is illustrated. In various embodiments the computer system 100 may be a personal computer, a laptop computer, a handheld computer, a netbook computer, a mobile device, a telephone, a personal data assistant (PDA), a server, a mainframe, a work terminal, or the like. The computer system includes a main structure 110, which may be a computer motherboard, system-on-a-chip, circuit board or printed circuit board, a desktop computer enclosure and/or tower, a laptop computer base, a server enclosure, part of a mobile device, personal data assistant (PDA), or the like. In one embodiment, the main structure 110 includes a graphics card 120. In one embodiment, the graphics card 120 may be an ATI Radeon™ graphics card from Advanced Micro Devices ("AMD") or any other graphics card using memory, in alternate embodiments. The graphics card 120 may, in different embodiments, be connected on a Peripheral Component Interconnect (PCI) Bus (not shown), PCI-Express Bus (not shown) an Accelerated Graphics Port (AGP) Bus (also not shown), or any other connection known in the art. It should be noted that embodiments of the present invention are not limited by the connectivity of the graphics card 120 to the main computer structure 110. In one embodiment, the computer system 100 runs an operating system such as Linux, Unix, Windows, Mac OS, or the like.

In one embodiment, the graphics card 120 may contain a processor such as the graphics processing unit (GPU) 125 used in processing graphics data. In various embodiments the graphics card 120 may be referred to as a circuit board or a printed circuit board or a daughter card or the like.

In one embodiment, the computer system 100 includes a processor, central processing unit (CPU) 140, which is connected to a northbridge 145. The CPU 140 and the northbridge 145 may be housed on the motherboard (not shown) or some other structure of the computer system 100. It is contemplated that in certain embodiments, the graphics card 120 may be coupled to the CPU 140 via the northbridge 145 or some other connection as is known in the art. For example, the CPU 140, the northbridge 145, and the GPU 125 may be included in a single processor, a single package or as part of a single die or "chips". Alternative embodiments, which may alter the arrangement of various components illustrated as forming part of main structure 110, are also contemplated. In certain embodiments, the northbridge 145 may be coupled to a system RAM (or DRAM) 155; in other embodiments, the system RAM 155 may be coupled directly to the CPU 140. The system RAM 155 may be of any RAM type known in the art; the type of RAM 155 does not limit the embodiments of the present invention. In one embodiment, the northbridge 145 may be connected to a southbridge 150. In other embodiments, the northbridge 145 and the southbridge 150 may be on the same chip in the computer system 100, or the northbridge 145 and the southbridge 150 may be on different chips. In various embodiments, the southbridge 150 may be connected to one or more data storage units 160. The data storage units 160 may be hard drives, solid state drives, magnetic tape, or any other writable media used for storing data. In various embodiments, the central processing unit 140, the northbridge 145, the southbridge 150, the graphics processing unit 125, and/or the DRAM 155 may be a computer chip or a silicon-based computer chip, or may be part of a computer chip or a silicon-based computer chip. In one or more embodiments, the various components of the computer system 100 may be operatively, electrically and/or physically connected or linked with a bus 195 or more than one bus 195.

In different embodiments, the computer system 100 may be connected to one or more display units 170, input devices 180, output devices 185, and/or peripheral devices 190. It is contemplated that in various embodiments, these elements may be internal or external to the computer system 100, and may be wired or wirelessly connected, without affecting the scope of the embodiments of the present invention. The display units 170 may be internal or external monitors, television screens, handheld device displays, and the like. The input devices 180 may be any one of a keyboard, mouse, track-ball, stylus, mouse pad, mouse button, joystick, scanner or the like. The output devices 185 may be any one of a monitor, printer, plotter, copier or other output device. The peripheral devices 190 may be any other device which can be coupled to a computer: a CD/DVD drive capable of reading and/or writing to physical digital media, a USB device, Zip Drive, external floppy drive, external hard drive, phone and/or broadband modem, router/gateway, access point and/or the like. To the extent certain exemplary aspects of the computer system 100 are not described herein, such exemplary aspects may or may not be included in various embodiments without limiting the spirit and scope of the embodiments of the present invention as would be understood by one of skill in the art.

Figure 2:
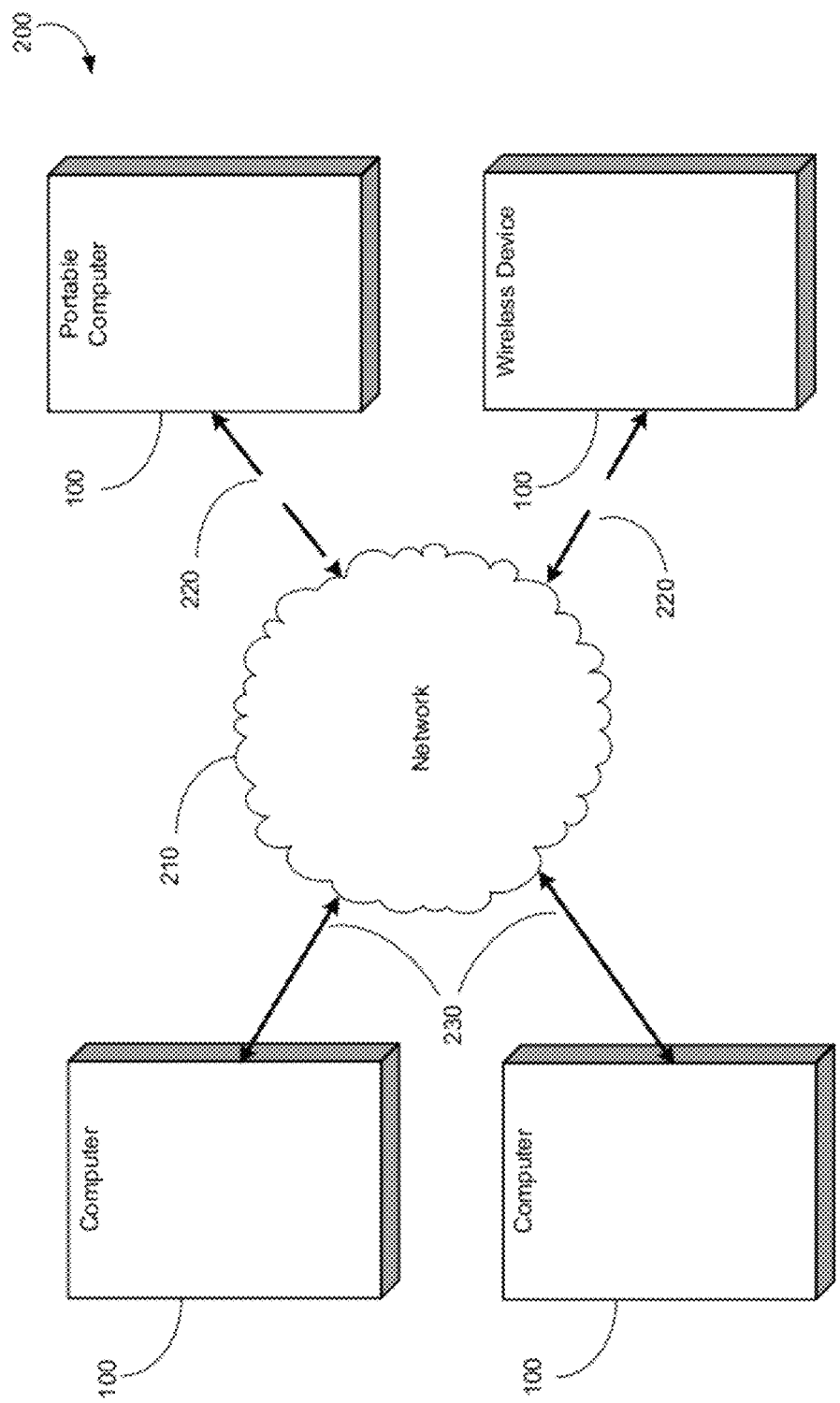
FIG. 2 shows a simplified block diagram of multiple computer systems connected via a network according to one embodiment.

Turning now to FIG. 2, a block diagram of an exemplary computer network 200, in accordance with an embodiment of the present invention, is illustrated. In one embodiment, any number of computer systems 100 may be communicatively coupled and/or connected to each other through a network infrastructure 210. In various embodiments, such connections may be wired 230 or wireless 220 without limiting the scope of the embodiments described herein. The network 200 may be a local area network (LAN), wide area network (WAN), personal network, company intranet or company network, the Internet, or the like. In one embodiment, the computer systems 100 connected to the network 200 via network infrastructure 210 may be a personal computer, a laptop computer, a netbook computer, a handheld computer, a mobile device, a telephone, a personal data assistant (PDA), a server, a mainframe, a work terminal, or the like. The number of computers depicted in FIG. 2 is exemplary in nature; in practice, any number of computer systems 100 may be coupled/connected using the network 200.

Figure 3:
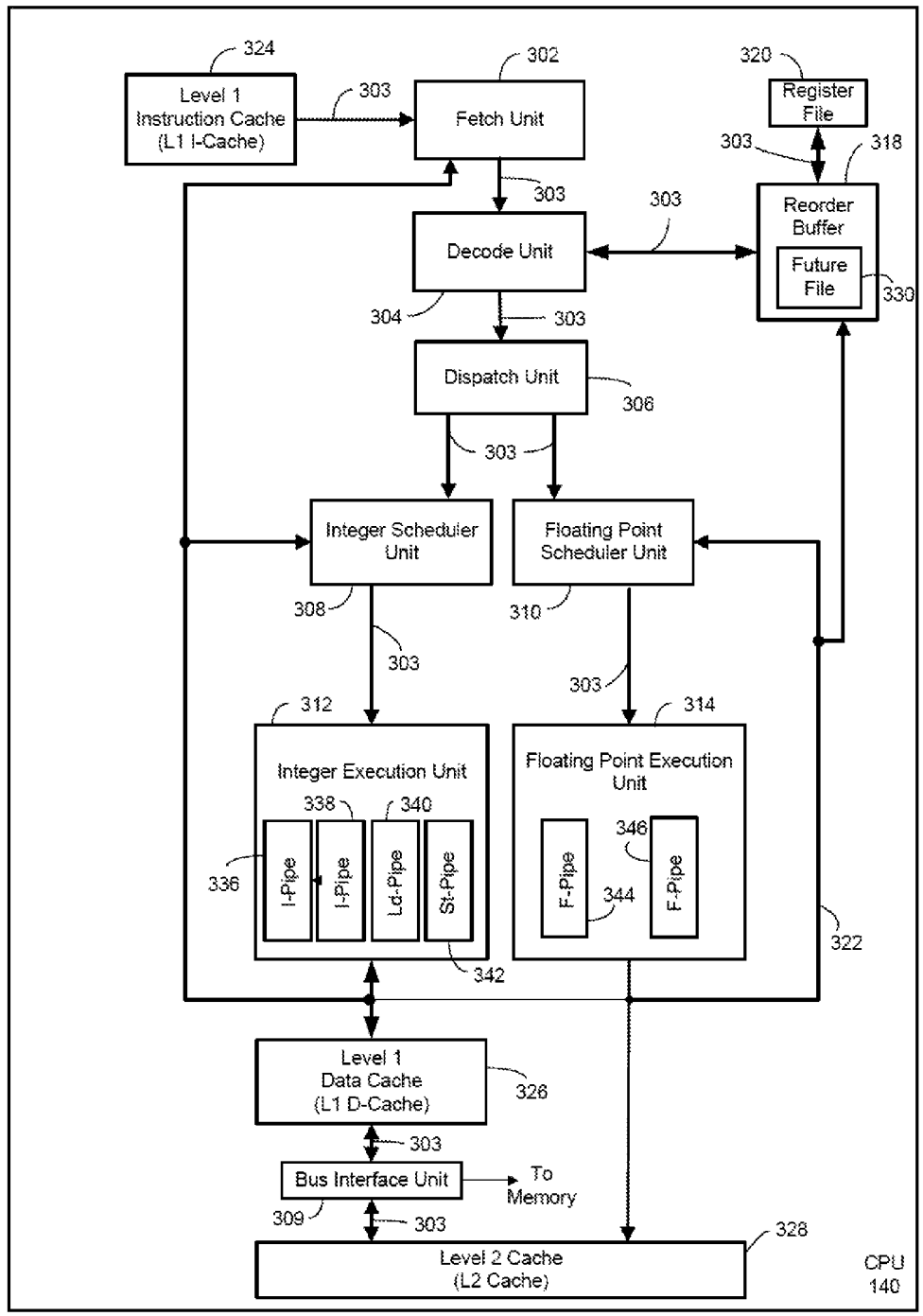
FIG. 3 illustrates an exemplary detailed representation of one embodiment of the central processing unit provided in FIGS. 1-2 according to one embodiment.

Turning now to FIG. 3, a diagram of an exemplary implementation of a processor, CPU 140, in accordance with an embodiment of the present invention, is illustrated. The CPU 140 includes a fetch unit 302, a decode unit 304, a dispatch unit 306, an integer scheduler unit 308 a floating-point scheduler unit 310, an integer execution unit 312, a floating-point execution unit 314, a reorder buffer 318, and a register file 320. In one or more embodiments, the various components of the CPU 140 may be operatively, electrically and/or physically connected or linked with a bus 303 or more than one bus 303. The CPU 140 may also include a result bus 322, which couples the integer execution unit 312 and the floating-point execution unit 314 with the reorder buffer 318, the integer scheduler unit 308, the floating-point execution unit 310 and the fetch unit 302. Results that are delivered to the result bus 322 by the execution units 312, 314 may be used as operand values for subsequently issued instructions and/or values stored in the reorder buffer 318. The CPU 140 may also include a Level 1 Instruction Cache (L1 I-Cache 324) for storing instructions, a Level 1 Data Cache (L1 D-Cache 326) for storing data and a Level 2 Cache (L2 Cache 328) for storing data and instructions. As shown, in one embodiment, the L1 D-Cache 326 may be coupled to the integer execution unit 312 via the result bus 322, thereby enabling the integer execution unit 312 to request data from the L1 D-Cache 326. In some cases, the integer execution unit 312 may request data not contained in the L1 D-Cache 326. Where requested data is not located in the L1 D-Cache 326, the requested data may be retrieved from a higher-level cache (such as the L2 cache 328) or the system memory 155 (shown in FIG. 1) via a bus interface unit 309. In another embodiment, the L1 D-cache 326 may also be coupled to the floating-point execution unit 314. In this case, the integer execution unit 312 and the floating-point execution unit 314 may share a unified L1 D-Cache 326. In another embodiment, the floating-point execution unit 314 may be coupled to its own respective L1 D-Cache. As shown, in one embodiment, the integer execution unit 312 and the floating-point execution unit 314 may be coupled to and share an L2 cache 328. In another embodiment, the integer execution unit 312 and the floating-point execution unit 314 may be each coupled to its own respective L2 cache. In one embodiment, the L2 cache 328 may provide data to the L1 I-Cache 324 and L1 D-Cache 326. In another embodiment, the L2 cache 328 may also provide instruction data to the L1 I-Cache 324. In different embodiments, the L1 I-Cache 324, L1 D-Cache 326, and the L2 Cache 328 may be may be implemented in a fully-associated, set-associative, or direct mapped configuration. In one embodiment, the L2 Cache 328 may be larger than the L1 I-Cache 324 or the L1 D-Cache 326. In alternate embodiments, the L1 I-Cache 324, the L1 D-Cache 326 and/or the L2 cache 328 may be separate from or external to the CPU 140 (e.g. located on the motherboard). It should be noted that embodiments of the present invention are not limited by the sizes and configuration of the L1 I-Cache 324, the L1 D-Cache 326, and the L2 cache 328.

Referring still to FIG. 3, the CPU 140 may support out-of-order instruction execution. Accordingly, the reorder buffer 318 may be used to maintain the original program sequence for register read and write operations, to implement register renaming, and to allow for speculative instruction execution and branch misprediction recovery. The reorder buffer 318 may be implemented in a first-in-first-out (FIFO) configuration in which operations move to the bottom of the reorder buffer 318 as they are validated, making room for new entries at the top of the reorder buffer 318. The reorder buffer 318 may retire an operation once an operation completes execution and any data or control speculation performed on any operations, up to and including that operation in program order, is verified. In the event that any data or control speculation performed on an operation is found to be incorrect (e.g., a branch prediction is found to be incorrect), the results of speculatively-executed instructions along the mispredicted path may be invalidated within the reorder buffer 318. It is noted that a particular instruction is speculatively executed if it is executed prior to instructions that precede the particular instruction in program order.

In one embodiment, the reorder buffer 318 may also include a future file 330. The future file 330 may include a plurality of storage locations. Each storage location may be assigned to an architectural register of the CPU 140. For example, in the x86 architecture, there are eight 32-bit architectural registers (e.g., Extended Accumulator Register (EAX), Extended Base Register (EBX), Extended Count Register (ECX), Extended Data Register (EDX), Extended Base Pointer Register (EBP), Extended Source Index Register (ESI), Extended Destination Index Register (EDI) and Extended Stack Pointer Register (ESP)). Each storage location may be used to store speculative register states (i.e., the most recent value produced for a given architectural register by any instruction). Non-speculative register states may be stored in the register file 320. When register results stored within the future file 330 are no longer speculative, the results may be copied from the future file 330 to the register file 320. The storing of non-speculative instruction results into the register file 320 and freeing the corresponding storage locations within reorder buffer 318 is referred to as retiring the instructions. In the event of a branch misprediction or discovery of an incorrect speculatively-executed instruction, the contents of the register file 320 may be copied to the future file 330 to replace any erroneous values created by the execution of these instructions.

Referring still to FIG. 3, the fetch unit 302 may be coupled to the L1 I-Cache 324 (or a higher memory subsystem, such as the L2 cache 328 or the system memory 155 (shown in FIG. 1)). The fetch unit 302 may fetch instructions from the L1 I-Cache 324 for the CPU 140 to process. The fetch unit 302 may contain a program counter, which holds the address in the L1 I-Cache 324 (or higher memory subsystem) of the next instruction to be executed by the CPU 140. In one embodiment, the instructions fetched from the L1 I-Cache 324 may be complex instruction set computing (CISC) instructions selected from a complex instruction set, such as the x86 instruction set implemented by processors conforming to the x86 processor architecture. Once the instruction has been fetched, the instruction may be forwarded to the decode unit 304. In one embodiment, the fetch unit 302 may also use prefetching techniques to increase the speed of program execution. For example, in one embodiment, the fetch unit 302 may request an instruction (or instructions) from the L2 cache 328 or the system memory 155 before it is actually ready for execution. Once the instruction comes back from the L2 cache 328 or the system memory 155, it may be placed in the L1 I-Cache 324. Thus, when the instruction is actually ready for execution, the instruction can be accessed much more quickly from the L1 I-Cache 324 than if it had to make a request from the L2 cache 328 or the system memory 155. In another embodiment, the prefetch and/or fetching of instructions may be part of a complex branch prediction algorithm. In this case, the fetch unit 302 may predict the result (i.e. the path to be taken) of a conditional branch instruction and fetch the corresponding instructions in advance. A conditional branch instruction can either be "not taken" or "taken." When the conditional branch instruction is "not taken," execution continues along the "not taken" path, where the instructions follow immediately after the conditional branch instruction. When the conditional branch instruction is "taken," execution may continue along the "taken" path, where instructions are stored in a different location in program memory. The path to be most likely taken (i.e., the predicted path) is fetched and speculatively executed. Upon detecting another conditional branch instruction in the fetched path, the predicted path for the newly-detected conditional branch instruction is also fetched. This process can be repeated multiple times so that multiple conditional branch instructions (and their respective predicted paths) are fetched, thereby creating a chain of conditional branch instructions and predicted paths for those conditional branch instructions. If it is later detected that a predicted path was wrong (e.g., when the conditional branch instruction is evaluated by the appropriate execution unit 312, 314), then the speculatively executed or partially executed instructions (i.e., the instructions precedent to the incorrectly-predicted path) are discarded, and the pipeline restarts by fetching instructions along the correct path.

In one embodiment, the fetch unit 302 may also include a fetch throttling mechanism used by the CPU 140 to halt fetching operations when a calculated confidence measure reaches a level below a threshold level. For example, the fetch throttling mechanism may accumulate a confidence measure based on a set of unresolved (i.e., outstanding) conditional branch instructions. As each conditional branch instruction is resolved, the confidence measure may be updated. In one embodiment, when the confidence measure reaches a level below the threshold level, the fetching operations may be halted. In another embodiment, the fetching operations may be reduced (i.e., the number of predicted paths fetched may be reduced to a predetermined value). In either case, the overall number of operations performed by the CPU 140 may be reduced, which may result in a lower consumption of power. The fetch unit 302 and the fetch throttling mechanism are described in greater detail with respect to FIG. 4.

Referring still to FIG. 3, the decode unit 304 may decode the instruction and determine the opcode of the instruction, the source and destination operands for the instruction, and a displacement value (if the instruction is a load or store) specified by the encoding of the instruction. The source and destination operands may be values in registers or in memory locations. A source operand may also be a constant value specified by immediate data specified in the instruction encoding. Values for source operands located in registers may be requested by the decode unit 304 from the reorder buffer 318. The reorder buffer 318 may respond to the request by providing either the value of the register operand or an operand tag corresponding to the register operand for each source operand. The reorder buffer 318 may access the future file 330 to obtain values for register operands. If a register operand value is available within the future file 330, the future file 330 may return the register operand value to the reorder buffer 318. On the other hand, if the register operand value is not available within the future file 330, the future file 330 may return an operand tag corresponding to the register operand value. The reorder buffer 318 may then provide either the operand value (if the value is ready) or the corresponding operand tag (if the value is not ready) for each source register operand to the decode unit 304. The reorder buffer 318 may also provide the decode unit 304 with a result tag associated with the destination operand of the instruction if the destination operand is a value to be stored in a register. In this case, the reorder buffer 318 may also store the result tag within a storage location reserved for the destination register within the future file 330. As instructions are completed by the execution units 312, 314, each of the execution units 312, 314 may broadcast the result of the instruction and the result tag associated with the result on the result bus 303. When each of the execution units 312, 314 produces the result and drives the result and the associated result tag on the result bus 322, the reorder buffer 318 may determine if the result tag matches any tags stored therein. If a match occurs, the reorder buffer 318 may store the result within the storage location allocated to the appropriate register within the future file 330.

After the decode unit 304 decodes the instruction, the decode unit 304 may forward the instruction to the dispatch unit 306. The dispatch unit 306 may determine if an instruction is forwarded to either the integer scheduler unit 308 or the floating-point scheduler unit 310. For example, if an opcode for an instruction indicates that the instruction is an integer-based operation, the dispatch unit 306 may forward the instruction to the integer scheduler unit 308. Conversely, if the opcode indicates that the instruction is a floating-point operation, the dispatch unit 306 may forward the instruction to the floating-point scheduler unit 310.

Once an instruction is ready for execution, the instruction is forwarded from the appropriate scheduler unit 308, 310 to the appropriate execution unit 312, 314. Instructions from the integer scheduler unit 308 are forwarded to the integer execution unit 312. In one embodiment, integer execution unit 312 includes two integer execution pipelines 336, 338, a load execution pipeline 340 and a store execution pipeline 342, although alternate embodiments may add to or subtract from the set of integer execution pipelines and the load and store execution pipelines. Arithmetic, logical, and branch instructions may be forwarded to either one of the two integer execution pipelines 336, 338, where the instructions are executed and the results of the instructions are broadcast to the reorder buffer 318, the scheduler units 308, 310, and/or the fetch unit 302 via the result bus 322. When executing a conditional branch instruction, the actual path to be taken by the conditional branch instruction may be determined. If it determined that the actual path to be taken is different than the path predicted by the fetch unit 302, then the speculatively-executed or partially executed instructions of the predicted path are discarded and the instructions along the correct path are fetched.

Memory instructions, such as load instructions and store instructions, may be forwarded, respectively, to the load execution pipeline 340 and the store execution pipeline 342, where the address for the load instruction or store instruction is generated. The load execution pipeline 340 and the store execution pipeline 342 may each include an address generation unit (AGU) (not shown), which generates the address for its respective load instruction or store instruction. Referring still to FIG. 3, instructions from the floating-point scheduler unit 310 are forwarded to the floating-point execution unit 314, which comprises two floating-point execution pipelines 344, 346, although alternate embodiments may add to or subtract from the set of floating-point execution pipelines 344, 346. The first execution pipeline 344 may be used for floating point division, multiplication and single-instruction multiple data (SIMD) permute instructions, while the second execution pipeline 346 may be used for other SIMD scalar instructions. Once the operations from either of the floating-point execution pipelines 344, 346 have completed, the results from the instructions may be written back to the reorder buffer 318, the floating-point scheduling unit 310, and the L2 cache 328 (or the system memory 155 (shown in FIG. 1)).

Figure 4:
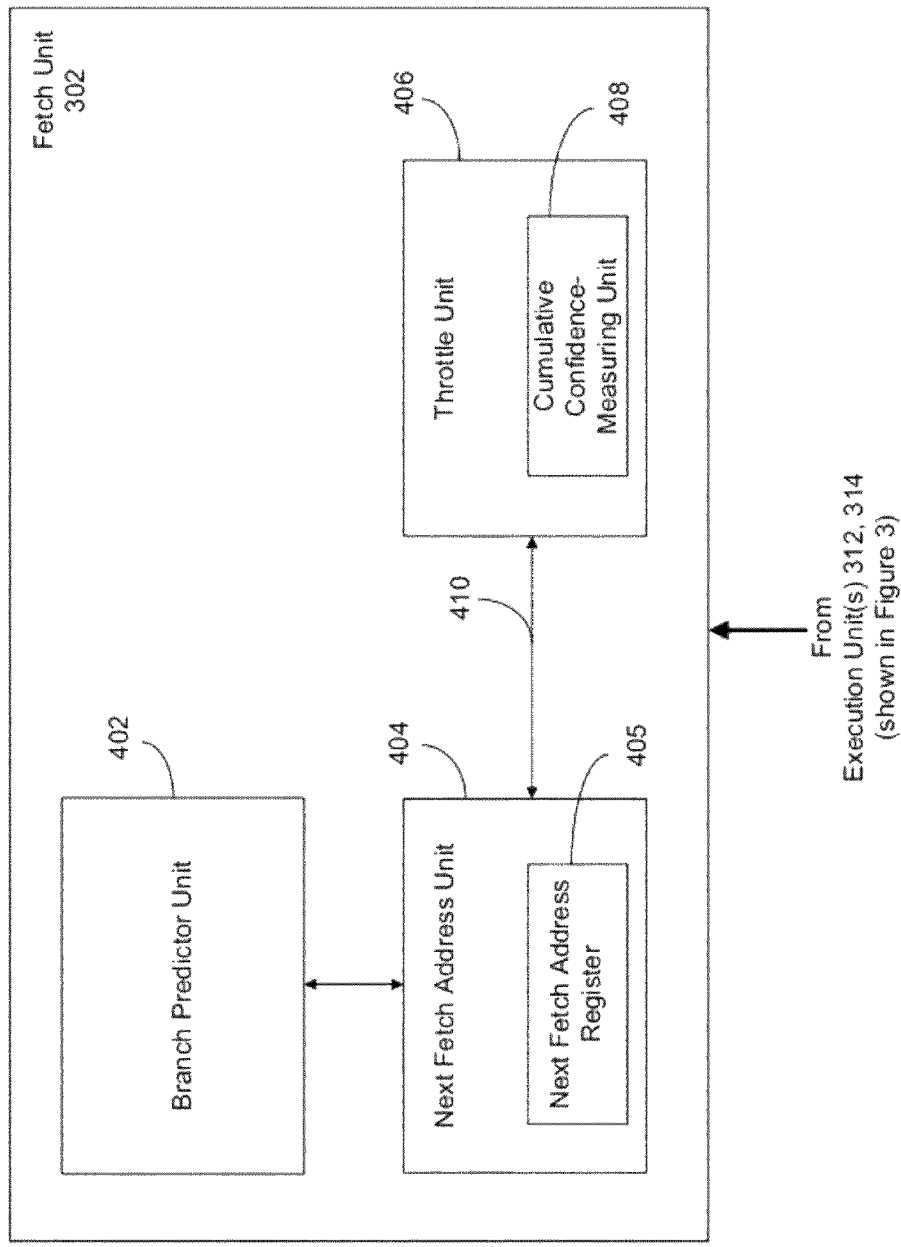
FIG. 4 illustrates an exemplary detailed representation of one embodiment of a fetch unit including a fetch throttling mechanism according to one embodiment of the present invention.

Turning now to FIG. 4, a block diagram of the fetch unit 302 including a fetch throttling mechanism, in accordance with an embodiment of the present invention, is illustrated. As shown, the fetch unit 302 may include a branch predictor unit 402, a next fetch address unit 404, and a throttle unit 406. The branch predictor unit 402 may predict whether or not the conditional branch instruction is to be "taken" or "not taken" using branch prediction algorithms known in the art (e.g., a static prediction algorithm, a next line prediction algorithm, a bimodal prediction algorithm, a local branch prediction algorithm, a global branch algorithm, and the like). Once the branch prediction unit 402 predicts whether or not a conditional branch instruction is to be "taken" or "not taken," it may assign the conditional branch instruction with a confidence measure. The confidence measure may indicate how likely the conditional branch instruction is to take the predicted path. For example, if the branch predictor unit 402 determines that a conditional branch instruction is likely to be "taken," the branch predictor unit 402 may assign a percentage value, which represents the confidence level, to the conditional branch instruction. If the predicted path is the "taken" path, a higher percentage value may represent that the conditional branch instruction is more likely to be "taken," while a lower percentage value may represent that the conditional branch instruction is less likely to be "taken." Similarly, if the predicted path is the "not taken" path, a higher percentage value may represent that the conditional branch instruction is more likely to be "not taken," while a lower percentage value may represent that the conditional branch instruction is less likely to be "not taken."

The next fetch address unit 404 may calculate the next address from which to fetch instructions. The next address may be the address where the instructions for the predicted path are stored. The next address may be stored in a next fetch address register 405. For example, if the branch predictor unit 402 predicts that a conditional branch instruction is likely to be "taken," then the next fetch address unit 404 may set the next fetch address register 405 to an address (e.g., of the L1 I-Cache 324, L2 cache 328 or the system memory 155) that holds the instructions for the "taken" path. On the other hand, if the branch predictor unit 402 predicts that a conditional branch is likely to be "not taken," then the next fetch address unit 404 may set the next fetch address register 405 to an address that holds the instructions for the "not taken" path.

Referring still to FIG. 4, the throttle unit 406 may be configured to halt fetching operations based on a cumulative confidence measure. Accordingly, the throttle unit 406 may include a cumulative confidence-measuring unit 408. The cumulative confidence-measuring unit 408 may accumulate a confidence measure based on a set of unresolved (i.e., outstanding) conditional branch instructions. As each conditional branch instruction is resolved, the confidence measure may be updated. When the confidence measure reaches a level below a threshold level, the fetching operations may be halted. In one embodiment, the threshold level may be predetermined. In another embodiment, the threshold level may be programmable (e.g., via a configuration register, fuse-controlled logic, or the like). Such programmability or user input changing the threshold may increase the threshold level as battery power decreases (in an attempt to stretch power resources). For example, suppose the fetch unit 302 fetches a conditional branch instruction and the branch predictor unit 402 assigns a confidence level of 90% for the predicted path (i.e., the conditional branch instruction has a 90% chance of taking the predicted path). Before deciding to fetch the instructions of the predicted path, the confidence level may be compared to the threshold level. If the confidence level is below the threshold level, then the throttle unit 406 may halt fetching operations. For instance, the throttle unit 406 may send a signal (via a bus 410) to the next fetch address unit 404 that prevents it from sending the next fetch address to the L1 I-Cache 324, L2 cache 328 or the system memory 155. On the other hand, if the confidence level is equal to or above the threshold level, the throttle unit 404 may send a signal (via the bus 410) to the next fetch address unit 404 to transmit the next fetch address to the L1 I-Cache 324, L2 cache 328 or the system memory 155 to fetch the instructions for the predicted path.

Continuing with the above example, suppose that the confidence level is above the threshold level and the instructions for the predicted path are fetched. Further suppose that another conditional branch instruction (i.e., a "secondary conditional branch instruction") is part of the predicted path. Accordingly, when the secondary conditional branch instruction is fetched, the branch predictor unit 402 may assign a confidence level to the secondary conditional branch instruction using a variety of different techniques. For illustrative purposes, suppose the confidence level assigned is 70%. In this case, the cumulative confidence-measuring unit 408 determines the cumulative confidence measure of the outstanding branch instructions. The cumulative confidence-measuring unit may multiply the confidence levels of each of the outstanding branch instructions (e.g., 90% and 70%) to determine the cumulative confidence measure. Using the example above, the cumulative confidence measure would be 63% ((0.90*0.70)*100). The cumulative confidence measure is then compared to the threshold level. If the confidence level is below the threshold level, then the throttle unit 406 may halt fetching operations. On the other hand, if the confidence level is equal to or above the threshold level, the instructions for the predicted path of the secondary conditional branch instruction are fetched (i.e., the fetching operations are continued).

As previously mentioned, the cumulative confidence measure may also be updated when outstanding conditional branch instructions are resolved. The conditional branch instructions may be resolved either in program order or out of program order. For example, suppose that there are currently three outstanding conditional branch instructions, where the first conditional branch instruction has a confidence level of 90%, the second conditional branch instruction (which is part of the predicted path of the first conditional branch instruction) has a confidence level of 70%, and the third conditional branch instruction (which is part of the predicted path of the second conditional branch instruction) has a confidence level of 55%. In this case, the cumulative confidence measure would be 34.65% ((0.90*0.70*0.55)*100). Next, suppose that the second conditional branch instruction is resolved first, thereby leaving the first and third conditional branch instructions as the outstanding conditional branch instructions. In this case, the appropriate execution unit 312, 314 (shown in FIG. 3) may transmit information (via the bus 303) to the cumulative confidence-measuring unit 408 indicating that the second conditional branch instruction has completed. In response to receiving the information, the cumulative confidence-measuring unit 408 may recalculate the cumulative confidence measure using the confidence levels of the first and third conditional branch instructions. Thus, in this example, the newly-calculated confidence measure would be 49.5% ((0.90*0.55)*100).

By calculating the cumulative confidence measure based on outstanding conditional branch instructions, the throttle unit 404 may be able to interchangeably switch between halting fetching operations and resuming fetching operations. For example, using the above example, suppose that the threshold level was set to 40%. When the first, second, and third conditional branch instructions were all outstanding, the cumulative confidence measure was 34.65%. Therefore, the cumulative confidence measure was below the threshold level. As a result, the throttle unit 404 may halt the fetching operations. However, when the second conditional branch instruction was resolved, the cumulative confidence measure was increased to 49.5%, thereby raising the cumulative confidence measure above the threshold level. As a result, the throttle unit 406 may resume fetching operations.

It is noted that the cumulative confidence measure may be determined using other methodologies. For example, in one embodiment, the cumulative confidence measure may be determined by calculating the mean (i.e., the average) of the confidence levels assigned to the conditional branch instructions. In another embodiment, the cumulative confidence measure may be determined by calculating the median of the confidence levels assigned to the conditional branch instructions. In yet another embodiment, the cumulative confidence measure may be determined by calculating the mode of the confidence levels assigned to the conditional branch instructions. In yet another embodiment, the cumulative confidence measure may be determined by calculating the range (i.e., the difference between the largest and smallest confidence levels) assigned to the conditional branch instructions.)

It is also noted, as previously stated, that in one embodiment, the rate at which fetching operations occur may be reduced (as opposed to being halted) when the confidence measure reaches a value below the threshold level. In this case, when the confidence measure reaches a level below the threshold value, the throttle unit 406 may maintain a counter that indicates the number of predicted paths fetched. The counter may be incremented every time a predicted path for a conditional branch instruction is fetched. The counter may be decremented every time a conditional branch instruction is retired. Once the counter reaches a predetermined value, the fetching operations may be halted. The fetching operations may return to their normal fetching rate once the cumulative confidence level reaches a level above the threshold value.

The fetch unit 302 may also receive information from the appropriate execution unit 312, 314 indicating whether or not a resolved conditional branch instruction was "taken" or "not taken." Using this information, the fetch unit 302 may determine if the path predicted by the branch predictor unit 402 was correct. For example, if the branch predictor unit 402 predicted that a conditional branch instruction was to take the "taken" path, and the appropriate execution unit 312, 314 indicates that the conditional branch instruction actually took the predicted path, then it may be determined that the branch predictor unit 402 predicted the path correctly. On the other hand, if the appropriate execution unit 312, 314 indicates that the conditional branch instruction did not actually take the predicted path, then it may be determined that the branch predictor unit 402 did not predict the path correctly. In this case, the instructions from the predicted path that were fetched may be discarded from the CPU 140 pipeline, and the instructions from the non-predicted path are fetched when the cumulative confidence measure is above the threshold level. Accordingly, the next fetch address register 405 may be updated with the address where the instructions for the non-predicted path are stored.

In one embodiment, the fetch unit 302 may resume fetching operations when the cumulative confidence measure reaches a threshold level different than the threshold level to halt fetching operations. In this case, the fetch unit 302 may support a first threshold level and a second threshold level. The first threshold level may be used to determine when to halt fetching operations. The second threshold level may be used to determine when to resume fetching operations. In one embodiment, the first and/or second threshold levels may be predetermined. In another embodiment, the first and/or second threshold levels may be programmable (e.g., via a configuration register, fuse-controlled logic, or the like).

Figure 5:
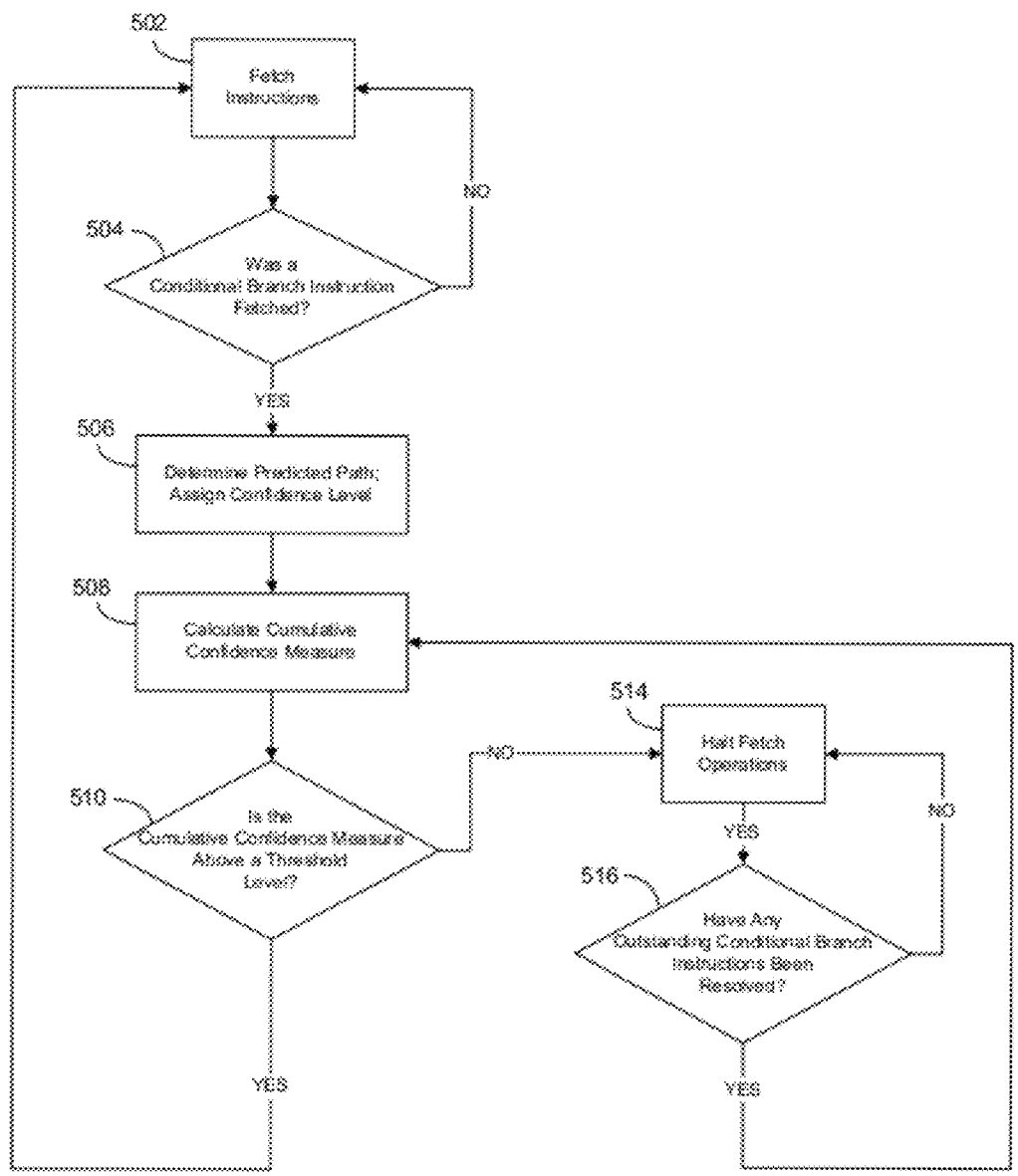
FIG. 5 illustrates a flowchart for operations for resuming and halting fetching operations according to one embodiment of the present invention.

Turning now to FIG. 5, a flowchart for operations for resuming and halting fetching operations, in accordance with one or more embodiments of the invention, is shown. The operations begin at block 502, where the fetch unit 302 fetches instructions (e.g., from the L1 I-Cache 324, L2 cache 328 or the system memory 155). At block 504, it is determined whether or not a conditional branch instruction was fetched. If it is determined that a conditional branch instruction was not fetched, then the fetch unit 302 continues fetching instructions at the block 502. On the other hand, if it is determined that a conditional branch instruction was fetched, operations continue at step 506, where the predicted path of the conditional branch instruction is determined, and the predicted path is assigned a confidence level. At block 508, the cumulative confidence measure is calculated. At block 510, it is determined whether or not the calculated confidence measure is above or equal to a threshold level. If it is determined that the cumulative confidence measure is above or equal to the threshold level, then fetch operations continue, where the predicted path of the conditional branch instruction is fetched at the block 502. The operations then return to the block 504 to determine whether or not the predicted path contains another conditional branch instruction. The fetch unit 302 may repeat the blocks 504, 506, 508, and 510 multiple times so long at the cumulative confidence measure remains above or equal to the threshold level. Accordingly, numerous conditional branch instructions may become outstanding in the CPU 140. Returning to step 510, if the cumulative confidence measure is lower than the threshold level, then the fetch operations are halted at block 514. At block 516, it is determined if any outstanding conditional branch instructions have been resolved by the appropriate execution unit 312, 314 (shown in FIG. 3). If it is determined that no outstanding conditional branch instructions have been resolved, then the fetch operations remain halted at the block 514. On the other hand, if it is determined that an outstanding conditional branch instruction has been resolved, operations continue at the block 508, where the cumulative confidence measure is recalculated using the remaining conditional branch instructions that are outstanding in the CPU 140. If the recalculated confidence measure is determined to be equal to or above the threshold level at the block 510, then the fetching operations are resumed at the block 502, where the predicted path for the previously-halted conditional branch instruction is fetched. However, if the recalculated confidence measure is determined to be lower than the threshold level, then the operations remain halted at the block 514.

It is also contemplated that, in some embodiments, different kinds of hardware descriptive languages (HDL) may be used in the process of designing and manufacturing very large scale integration circuits (VLSI circuits) such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate GDS data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., data storage units 160, RAMs 130 & 155, compact discs, DVDs, solid state storage and the like). In one embodiment, the GDSII data (or other similar data) may be adapted to configure a manufacturing facility (e.g., through the use of mask works) to create devices capable of embodying various aspects of the instant invention. In other words, in various embodiments, this GDSII data (or other similar data) may be programmed into a computer 100, processor 125/140 or controller, which may then control, in whole or part, the operation of a semiconductor manufacturing facility (or fab) to create semiconductor products and devices. For example, in one embodiment, silicon wafers containing 10 T bitcells 500, 10 T bitcell arrays 420 and/or array banks 410 may be created using the GDSII data (or other similar data).

It should also be noted that while various embodiments may be described in terms of memory storage for graphics processing, it is contemplated that the embodiments described herein may have a wide range of applicability, not just for graphics processes, as would be apparent to one of skill in the art having the benefit of this disclosure.

The particular embodiments disclosed above are illustrative only, as the invention may be modified and practiced in different but equivalent manners apparent to those skilled in the art having the benefit of the teachings herein. Furthermore, no limitations are intended to the details of construction or design as shown herein, other than as described in the claims below. It is therefore evident that the particular embodiments disclosed above may be altered or modified and all such variations are considered within the scope and spirit of the claimed invention.

Accordingly, the protection sought herein is as set forth in the claims below.

What is claimed:

1. A method comprising:
identifying a plurality of confidence measures for a plurality of outstanding conditional branch instructions along a predicted path, each of the plurality of confidence measures comprising a percentage value between zero and one hundred percent, a first of the plurality of confidence measures different from a second of the plurality of confidence measures;
calculating a cumulative confidence measure based on a multiplication of the plurality of confidence measures including the first and second of the plurality of confidence measures;
recalculating, after a completion of one of the plurality of outstanding conditional branch instructions, the cumulative confidence measure for a remainder of the plurality of outstanding conditional branch instructions along the predicted path; and
reducing prefetching operations in response to detecting that the cumulative confidence measure is below a first threshold level.

2. The method of claim 1, further comprising:
recalculating the cumulative confidence measure in response to completion of another one of the plurality of outstanding conditional branch instructions; and
increasing fetching operations in response to detecting that the recalculated cumulative confidence measure is above or equal to a second threshold level.

3. The method of claim 2, wherein the first threshold level and the second threshold level are different values.

4. The method of claim 2, wherein the plurality of outstanding branch instructions are executed in program order.

5. The method of claim 2, wherein the plurality of outstanding branch instructions are executed out of program order.

6. The method of claim 2, wherein at least one of the first threshold level and the second threshold level is programmable.

7. An apparatus comprising:
a processor configured to:
identify a plurality of confidence measures for a plurality of outstanding conditional branch instructions along a predicted path, each of the plurality of confidence measures comprising a percentage value between zero and one hundred percent, a first of the plurality of confidence measures different from a second of the plurality of confidence measures;
calculate a cumulative confidence measure based on a multiplication of the plurality of confidence measures including the first and the second of the plurality of confidence measures;
recalculate, after a completion of one of the plurality of outstanding conditional branch instructions, the cumulative confidence measure for a remainder of the plurality of outstanding conditional branch instructions along the predicted path; and
reduce prefetching operations in response to detecting that the cumulative confidence measure is below a first threshold level.

8. The apparatus of claim 7, wherein the processor is further configured to:
recalculate the cumulative confidence measure in response to completion of another one of the plurality of outstanding conditional branch instructions; and
increase fetching operations in response to detecting that the recalculated cumulative confidence measure is above or equal to a second threshold level.

9. The apparatus of claim 8, wherein the first threshold level and the second threshold level are different values.

10. The apparatus of claim 8, wherein the plurality of outstanding branch instructions are executed in program order.

11. The apparatus of claim 8, wherein the plurality of outstanding branch instructions are executed out of program order.

12. The apparatus of claim 8, wherein at least one of the first threshold level and the second threshold level is programmable.

13. A non-transitory computer readable storage medium encoded with data that, when implemented in a manufacturing facility, adapts the manufacturing facility to create an apparatus, comprising:
a processor configured to:
identify a plurality of confidence measures for a plurality of outstanding conditional branch instructions along a predicted path, each of the plurality of confidence measures comprising a percentage value between zero and one hundred percent, a first of the plurality of confidence measures different from a second of the plurality of confidence measures;
calculate a cumulative confidence measure based on a multiplication of the plurality of confidence measures including the first and second of the plurality of confidence measures;
recalculate, after a completion of one of the plurality of outstanding conditional branch instructions, the cumulative confidence measure for a remainder of the plurality of outstanding conditional branch instructions along the predicted path; and reduce prefetching operations in response to detecting that the cumulative confidence measure is below a first threshold level.

14. The computer readable storage medium of claim 13, wherein the processor is further configured to:

recalculate the cumulative confidence measure in response to completion of another one of the plurality of outstanding conditional branch instructions; and increase fetching operations in response to detecting that the recalculated cumulative confidence measure is above or equal to a second threshold level.

15. The computer readable storage medium of claim 14, wherein the first threshold level and the second threshold level are different values.

16. The computer readable storage medium of claim 14, wherein the plurality of outstanding branch instructions are executed out of program order.

17. The computer readable storage medium of claim 14, wherein at least one of the first threshold level and the second threshold level is programmable.

* * * * *